(12) United States Patent
Rezazadeh et al.

(10) Patent No.: US 8,532,396 B2
(45) Date of Patent: *Sep. 10, 2013

(54) METHOD AND SYSTEM FOR DETERMINING STRUCTURAL SIMILARITY BETWEEN IMAGES

(71) Applicant: Ecole de Technologie Superieure, Montreal (CA)

(72) Inventors: Soroosh Rezazadeh, Montreal (CA); Stéphane Coulombe, Brossard (CA)

(73) Assignee: Ecole de Technologie Superieure, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/692,950

(22) Filed: Dec. 3, 2012

(65) Prior Publication Data

US 2013/0094769 A1    Apr. 18, 2013

Related U.S. Application Data

(63) Continuation of application No. 12/499,928, filed on Jul. 9, 2009, now Pat. No. 8,326,046.

(60) Provisional application No. 61/151,784, filed on Feb. 11, 2009.

(51) Int. Cl.
*G06K 9/62* (2006.01)

(52) U.S. Cl.
USPC ........... 382/199; 382/232; 382/233; 382/240; 382/128; 382/260

(58) Field of Classification Search
USPC ................. 382/199, 232, 233, 128, 203, 240, 382/243, 246, 260, 166; 375/240.18, 240.19, 375/240.08; 250/202, 363.06
See application file for complete search history.

(56) References Cited

U.S. PATENT DOCUMENTS

| | | | |
|---|---|---|---|
| 5,799,112 A | 8/1998 | De Queiroz et al. | |
| 6,005,978 A | 12/1999 | Garakani et al. | |
| 7,228,006 B2 | 6/2007 | Stubler et al. | |
| 7,483,486 B2 | 1/2009 | Mantiuk et al. | |
| 8,213,735 B2 * | 7/2012 | Cooksey et al. | 382/260 |
| 2002/0009142 A1 | 1/2002 | Aono et al. | |
| 2003/0169928 A1 | 9/2003 | Stanek | |
| 2004/0146205 A1 | 7/2004 | Becker et al. | |
| 2006/0072838 A1 | 4/2006 | Chui et al. | |

(Continued)

OTHER PUBLICATIONS

Z. Wang et al., Image Quality Assessment: From Error Visibility to Structural Similarity, IEEE Transactions on Image Processing, vol. 13, No. 4, pp. 600-612, Apr. 2004.

(Continued)

*Primary Examiner* — Ali Bayat
(74) *Attorney, Agent, or Firm* — IP-MEX Inc.; Victoria Donnelly

(57) ABSTRACT

Method and system for low complexity assessment of quality of an image are presented. By performing multiresolution decomposition of images using, for example, a discrete wavelet transform, and determining a metric based on a structural similarity index or a structural similarity map, a structural similarity score, characterizing similarity between images with a high degree of accuracy, is produced. The processing time is much smaller in comparison to that required by other methods producing image quality metrics of comparable accuracy.

20 Claims, 12 Drawing Sheets

(56) References Cited

U.S. PATENT DOCUMENTS

| | | | |
|---|---|---|---|
| 2009/0097721 A1* | 4/2009 | Kingsbury et al. | ........... 382/128 |
| 2009/0304273 A1 | 12/2009 | Fukuhara | |
| 2010/0008574 A1 | 1/2010 | Ishiga | |
| 2010/0048242 A1* | 2/2010 | Rhoads et al. | ............. 455/556.1 |
| 2011/0033119 A1 | 2/2011 | Rezazadeh et al. | |
| 2011/0038548 A1 | 2/2011 | Rezazadeh et al. | |
| 2011/0212717 A1* | 9/2011 | Rhoads et al. | ................ 455/420 |

OTHER PUBLICATIONS

H.R. Sheikh et al., A Statistical Evaluation of Recent Full Reference Image Quality Assessment Algorithms, IEEE Transactions on Image Processing, vol. 15, No. 11, pp. 3441-3452, Nov. 2006.

Z. Wang et al., Multi-Scale Structural Similarity for Image Qualitiy Assessment, 37th IEEE Asilomar Conference on Signals, Systems and Computers, pp. 1398-1402, Nov. 2003.

D.M. Rouse et al., Understanding and Simplifying the Structural Similarity Metric, IEEE International Conference on Image Processing, San Diego, pp. 1188-1191, Oct. 2008.

C.-L. Yang et al., Discrete Wavelet Transform-Based Structural Similarity for Image Quality Assessment, IEEE International Conference on Image Processing, San Diego, pp. 377-380, Oct. 2008.

Z. Wang et al., Spatial Pooling Strategies for Perceptual Image Quality Assessment, IEEE International Conference on Image Processing, Atlanta, pp. 2945-2948, Oct. 2006.

H.R. Sheikh et al., Image Information and Visual Quality, IEEE Transactions on Image Processing, vol. 15, No. 2, pp. 430-444, Feb. 2006.

Z,Wang et al., Modern Image Quality Assessment, Morgan and Claypool, United States, p. 416, 2006.

H.R. Sheikh et al., Live Image Quality Assessment Database, Release 2, http://live.ece.utexas.edu/research/quality.

Final report from the Video Quality Experts Group on the validation of Objective Models of Video Quality Assessment, Phase II VQEG, available at: http://www.vqeg.org, Aug. 2003.

Intel 64 and IA32 Architectures Optimization Reference Manual, Intel Corporation, Nov. 2009.

T. Mitsa, and K. L. Varkur, "Evaluation of contrast sensitivity functions for the formulation of quality measures incorporated in halftoning algorithms," in Proc. IEEE Int. Conf. Acoustics, Speech, Signal Processing, vol. 5, pp. 301-304, Apr. 1993.

J. L. Mannos, and D. J. Sakrison, "The effects of a visual fidelity criterion on the encoding of images," IEEE Trans. Inf. Theory, vol. IT-20, No. 4, pp. 525-536, Jul. 1974.

Z. Wang's SSIM Research Homepage [Online]. Available at: http://www.ece.uwaterloo.ca/~z70wang/research/ssim/.

Y.-K. Lai, C.-C. J. Kuo, "A Haar wavelet approach to compressed image quality measurement," J. Visual Commun. Imag. Represent., vol. 11, No. 1, pp. 17-40, Mar. 2000.

M. R. Bolin, and G. W. Meyer, "A visual difference metric for realistic image synthesis," in Proc. SPIE Human Vision, Electron. Imag., vol. 3644, San Jose, pp. 106-120, 1999.

S. L. P. Yasakethu, W.A. C. Fernando, S Adedoyin, and A. Kondoz, "A rate control technique for off line H.264/AVC video coding using subjective quality of video." IEEE Trans. Consum. Electron., vol. 54, No. 3, pp. 1465-1472, Aug. 2008.

H. R. Sheikh, A. C. Bovik, and G. de Veciana, "An information fidelity criterion for image quality assessment using natural scene statistics," IEEE Trans. Image Process., vol. 14, No. 12, pp. 2117-2128, Dec. 2005.

Z.Wang and A.C.Bovik, "Mean squared error: Love it or leave it? A new look at signal fidelity measures", IEEE Signal Process.Mag., bol.26, No. 1, pp. 98-117, Jan. 2009.

Tampere Image Database 2008 TID2008, Version 1.0, available at: http://www.ponomarenko.info/tid2008.htm.

A.C.Bovik, The Essential Guide to Image Processing. USA: Academic Press, 2009, ch.21.

S.Daly, "The visible difference predictor: An algorithm for the assessment of image fidelity", in Proc. SPIE, vol. 1616, Feb. 1992, pp. 2-15.

J.Lubin, "A visual discrimination model for imaging system design and evaluation" in Visual Models for Target Detection and Recognition, Singapore: World Scientific, 1995, pp. 207-220.

P.C.Teo and D.J.Heeger, Perceptual Image distortion, in Proc. IEEE. Int. Conf. Image Process., vol. 2, Nov. 1994, pp. 982-986.

D.M.Chandler, and S. S.Hemami, "VSNR: A wavelet-based visual signal-to-noise ratio for natural images" IEEE Trans.Image Process., vol. 16, No. 9, pp. 2284-2298, Sep. 2007.

N.Damera-Venkata, T.D. Kite, W.S. Geisler, B. L. Evans, and A.C. Bovik , "Image quality assessment based on a degradation model" IEEE Trans.Image Process., vol. 9, No. 4, pp. 636-650, Apr. 2000.

M. Miyahara, K. Kotani, and V. R. Algazi, "Objective Picture Quality Scale (PSQ) for Image Coding", IEEE Trans. Commun., vol. 46, No. 9, pp. 1215-1225, Sep. 1998.

N. Ponomarenko, F Battisti, K. Egiazarian, J. Astola, and V. Lukin, "Metrics performance comparison for color image database," in Proceedings Fourth International Workshop on Video Processing and Quality Metrics for Consumer Electronics, Jan. 2009, Arizona, USA.

Z.Wang, E. P. Simoncelli, "Translation insensitive image similarity in complex wavelet domain", in Proc. IEEE Int. Conf. Acoustics, Speech, Signal Process., vol. 2, Mar. 2005, pp. 573-576.

M. P. Sampat, Z. Wang, S Gupta, A.C. Bovik, and M. K. Markey, "Complex wavelet structural similarity: A new image similarity index", IEEE Trans. Image Process., vol. 18, No. 11, pp. 2385-2401, Nov. 2009.

Y.Wang, J.Ostermann and Y.-Q Zhang "Video Processing Communications" Prentice Hall, 2001.

S. Rezazadeh and S. Coulombe, "Low-Complexity computation of visual information fidelity in the discrete wavelet domain," in Proc. IEEE Int. Conf. Acoustics, Speech, Signal Process., Dallas, TX, Mar. 2010, pp. 2438-2441.

Patrick Le Callet and Florent Autrusseau, "Subjective quality assessment IRCCyN/IVC database," available at: http://www.irccyn.ee-nantes.fr/ivcdb.

Intel Integrated Performance Primitives. Available at: http://software.intel.com/en-us/intel-ipp/.

S. Rezazadeh and S. Coulombe, "A novel discrete wavelet transform framework for full reference image quality assessment" in Signal, Image and Video Processing, pp. 1-15, Sep. 2011.

http://sipi.usc.edu/database/database.php?volume=misc.

* cited by examiner

| Model | CC | RMSE | ROCC |
|---|---|---|---|
| PSNR | 0.8701 | 13.4685 | 0.8756 |
| SSIM$_{W\&B}$ | 0.9041 | 11.6736 | 0.9104 |
| DWT-SSIM | 0.9346 | 9.7201 | 0.9346 |
| VIF | 0.9593 | 7.7122 | 0.9635 |
| Mean SSIM$_A$ | 0.9412 | 9.2270 | 0.9441 |
| WSSIM | 0.9548 | 8.1176 | 0.9586 |

*Figure 9*

METHOD AND SYSTEM FOR DETERMINING STRUCTURAL SIMILARITY BETWEEN IMAGES

RELATED APPLICATIONS

The present application is a Continuation of U.S. patent application Ser. No. 12/499,928 filed Jul. 9, 2009, issued as U.S. Pat. No. 8,326,046 on Dec. 4, 2012, which claims priority from the U.S. provisional application Ser. No. 61/151,784 filed Feb. 11, 2009, the contents of which are incorporated herein by reference.

FIELD OF THE INVENTION

The present invention relates to the assessment of image quality, and in particular, to a method and system for determining structural similarity between images.

BACKGROUND OF THE INVENTION

Assessment of quality of images is important in the context of various domains including image compression and transcoding. Transcoding of images is becoming increasingly important as rich multimedia content comprising text, voice, still and animated graphics, photos, video clips, is being delivered in heterogeneous networks composed of mobile terminals, cell phones, computers and other electronic devices. Image quality can be assessed by measuring similarity between an original image and an image obtained after image processing. Such an assessment of quality can be used to determine the effectiveness of an image processing technique.

A full-reference (FR) quality assessment of images generally involves two categories of approach: bottom-up and top-down as described by Z. Wang and A. C. Bovik in "Modern Image Quality Assessment", Morgan & Claypool, United States, 2006. In the bottom-up approaches, scores for quality of images are best estimated by quantifying the visibility of errors. These prior art methods have several important limitations, which are described by Z. Wang and A. C. Bovik in "Modern Image Quality Assessment", Morgan & Claypool, United States, 2006. In the top-down approaches, the whole Human Visual System (HVS) is considered as a black box, and the hypothesized functionality of the overall HVS is simulated rather than mathematically modelled. In a typical mathematical model each functional perceptual component needs to be modelled individually, and all component models, which serve as basic building blocks, are integrated into an overall system model.

One of the main methods in the top-down category described in the literature is the Structural SIMilarity ($SSIM_{W\&B}$) index, which gives an accurate score for image quality with acceptable computational complexity in comparison to other quality metrics, described by H. R. Sheikh, M. F. Sabir, and A. C. Bovik, in "A Statistical Evaluation of Recent Full Reference Image Quality Assessment Algorithms," IEEE Transactions on Image Processing, vol. 15, no. 11, pp. 3441-3452, November 2006. $SSIM_{W\&B}$ has attracted a great deal of attention in recent years, and has been considered for a wide range of applications. The idea underlying the $SSIM_{W\&B}$ is that the HVS adapts to structural information extracted from visual scenes, and, therefore, a measurement of structural similarity (or distortion) should provide a good approximation of image quality. Some approaches have tried to improve the SSIM index. The Multi-scale SSIM described by Z. Wang, E. P. Simoncelli, and A. C. Bovik, in "Multi-Scale Structural Similarity for Image Quality Assessment," $37^{th}$ IEEE Asilomar Conference on Signals, Systems and Computers, pp. 1398-1402, November 2003, attempts to increase the accuracy of SSIM assessment by incorporating image details at different resolutions in pixel domain. In the paper by D. M. Rouse, and S. S. Hemami, "Understanding and Simplifying the Structural Similarity Metric," IEEE International Conference on Image Processing, San Diego, pp. 1188-1191, October 2008, the authors investigate ways to simplify the computation of $SSIM_{W\&B}$ index in the pixel domain. A method to compute it using subbands at different levels in the discrete wavelet domain is proposed by C-L. Yang, W-R. Gao, and L-M. Po, in "Discrete Wavelet Transform-based Structural Similarity for Image Quality Assessment," IEEE International Conference on Image Processing, San Diego, pp. 377-380, October 2008. Five-level wavelet decomposition using the Daubechies 9/7 filter is applied to both original and distorted images, and then the $SSIM_{W\&B}$ index is computed between corresponding subbands. Finally, the similarity score is obtained by computing the weighted mean of all SSIM indices. To determine the weights, a large number of experiments need to be performed however, for measuring the sensitivity of the human eye to different frequency bands.

Before explaining the present invention, a brief discussion of the wavelet transformation technique used for multiresolution decomposition of images is presented first. Two dimensional discrete wavelet transform (DWT) is applied to a digital image with discrete values for separating low frequency content of images from its high frequency content. Coefficients obtained after applying a discrete wavelet transform make up a discrete wavelet domain. For extracting these contents DWT exploits two types of filters: a low-pass filter and a high pass-filter. In one level DWT, the discrete wavelet transform is applied only once to an image. In two dimensions, the one level DWT is typically obtained by applying separable one dimensional (1D) filters (one low-pass filter and one high-pass filter) horizontally and vertically. The various combinations of horizontal and vertical applications of the low-pass and the high-pass filters lead to four different combinations of a resulting image. Therefore, when DWT is applied to an image for one level decomposition, four subbands (images) are obtained: one approximation subband and three detail subbands including a horizontal subband, a vertical subband, and a diagonal subband as shown in FIG. 1.

Block diagram 100 presented in FIG. 1 shows one level multiresolution decomposition using discrete wavelet transform of an image 102 according to the prior art. The decomposition results in four subbands: an approximation subband 104, a horizontal subband 106, a vertical subband 108 and a diagonal subband 110. Each of the subbands is of a quarter size or resolution of the image 102. The approximation subband 104 contains main content (low frequency content) of the image 102. The detail subbands include fine edges and textures of the image 102. For example, the horizontal subband 106 contains horizontal edges of the image 102. The vertical subband 108 and the diagonal subband 110 are used in the same way as the horizontal subband 106 and form the vertical and diagonal edges of the image 102 respectively. FIG. 2 presents a diagram 200 displaying the result of applying the one level DWT decomposition to a sample Image Lena 202 resulting in four subbands: an approximation subband $Lena_A$ 204, a horizontal detail subband $Lena_H$ 206, a vertical detail subband $Lena_V$ 208 and a diagonal subband $Lena_D$ 210. As discussed earlier, $Lena_A$ 204 contains the main contents whereas the fine edges are captured in the three detail subbands: $Lena_H$ 206, $Lena_V$ 208 and $Lena_D$ 210.

Although assessment of image quality has received considerable attention from researchers, the existing prior art methods have numerous shortcomings that include the following.

First, a SSIM map based method described by Z. Wang, A. C. Bovik, H. R. Sheikh and E. P. Simoncelli, in "Image Quality Assessment: From Error Visibility to Structural Similarity," IEEE Transactions on Image Processing, vol. 13, no. 4, pp. 600-612, April 2004, computes local statistics within a local square window in the pixel domain, even though the statistics of blocks in the wavelet domain are more accurate. The SSIM map gives the visual quality/distortion within each local window.

Second, multi-scale and multi-level SSIMs discussed by C-L. Yang, W-R. Gao, and L-M. Po, in "Discrete Wavelet Transform-based Structural Similarity for Image Quality Assessment," IEEE International Conference on Image Processing, San Diego, pp. 377-380, October 2008, for determining the sensitivity of the HVS to different subbands requires many experiments. Moreover, if a wavelet or filter is changed, the computed weights and parameters are no longer optimum and may not even be valid.

Third, the five-level decomposition of images, as in the paper by Yang et al. mentioned in the previous paragraph, would make the size of the approximation subband very small; so it would no longer be useful in the effective extraction of image statistics.

Fourth, prior art methods use the mean of the SSIM maps to generate the score for image quality. However, distortions in various image areas have different impacts on the HVS.

Therefore there is a need in the industry for developing an improved method, which would accurately assess the quality of an image and would have a low complexity in order to be applied in real-time applications. Such a method would need to avoid or mitigate the above-mentioned drawbacks of the prior art.

SUMMARY OF THE INVENTION

Therefore it is an object of the present invention to provide an improved method and system for determining similarity between images to assess quality of an image.

According to one aspect of the invention, there is provided a method for determining a measure of similarity between an image X and an image Y, having the same number of rows and columns of pixels, the method comprising: (a1) applying a one level multiresolution decomposition to the image X, producing an approximation subband containing main content of the image X and detail subbands containing fine edges of the image X; (b1) applying said one level multiresolution decomposition to the image Y, producing an approximation subband containing main content of the image Y and detail subbands containing fine edges of the image Y; (c1) determining an approximation similarity measure, characterizing similarity between the main content of the image X and the main content of the image Y, by processing the approximation subband of the image X and the approximation subband of the image Y; (d1) aggregating the detail subbands of the image X, producing an aggregate for the image X; (e1) aggregating the detail subbands of the image Y, producing an aggregate for the image Y; (f1) determining an edge similarity measure, characterizing similarity between the fine edges of the image X and the fine edges of the image Y, by processing the aggregate for the image X and the aggregate for the image Y; and (g1) determining a Structural Similarity (SSIM) score as the measure of similarity between the image X and the image Y by processing the approximation similarity measure and the edge similarity measure. The steps (a1) and (b1) comprise applying one of a discrete wavelet transform (DWT) or a discrete cosine transform (DCT); and wherein the step (g1) comprises determining a Wavelet Structural Similarity (WSSIM) score provided the DWT has been applied in the steps (a1) and (b1), or a Cosine Structural Similarity (CSSIM) score provided the DCT has been applied in the steps (a1) and (b1). The step (c1) of determining the approximation similarity measure comprises determining a structural similarity map $SSIM_A$ characterizing a difference between pixels in the approximation subband of the image X and corresponding pixels in the approximation subband of the image Y. The step (c1) of determining the approximation similarity measure comprises determining a structural similarity index using a Visual Information Fidelity (VIF) method, the structural similarity index characterizing a difference between pixels in the approximate subband of the image X and corresponding pixels in the approximation subband of the image Y. The step (f1) of determining the edge similarity measure comprises determining an edge structural similarity map $SSIM_E$ characterizing a difference between pixels in the aggregate for the image X and corresponding pixels in the aggregate for the image Y. The step (f1) of determining the edge similarity measure comprises determining an edge structural similarity index using a Visual Information Fidelity (VIF) method, the edge structural similarity index characterizing a difference between pixels in the aggregate for the image X and corresponding pixels in the aggregate for the image Y. The step (g1) comprises processing the $SSIM_A$ and the $SSIM_E$ to obtain the SSIM score. The detail subbands of the image X include one or more of a horizontal subband containing horizontal fine edges, a vertical subband containing vertical fine edges and a diagonal subband containing diagonal fine edges of the image X, and wherein the detail subbands of the image Y include one or more of a horizontal subband containing horizontal fine edges, a vertical subband containing vertical fine edges, and a diagonal subband containing diagonal fine edges of the image Y. The detail subbands of the image X include one or more of a horizontal subband containing horizontal fine edges, a vertical subband containing vertical fine edges and a diagonal subband containing diagonal fine edges of the image X, and wherein the detail subbands of the image Y include one or more of a horizontal subband containing horizontal fine edges, a vertical subband containing vertical fine edges, and a diagonal subband containing diagonal fine edges of the image Y. The step (d1) comprises: (a10) generating an edge map for the image X, including calculating weighted norm of the detail subbands of the image X; and the step (e1) comprises: (b10) generating an edge map for the image Y, including calculating weighted norm of the detail subbands of the image Y.

The step (g1) of the method further comprises: (a11) generating a contrast map, including assigning corresponding values to the pixels of the image X and the image Y according to their respective importance to human visual system; (b11) performing weighted pooling of the approximation similarity measure by using the contrast map to produce an approximation similarity index; (c11) performing weighted pooling of the edge similarity measure by using the contrast map to produce an edge similarity index; and (d11) combining the approximation similarity index from the step (b11) with the edge similarity index from the step (c11) to determine the SSIM score; (a12) generating a contrast map, including assigning corresponding values to the pixels of the image X and the image Y according to their respective importance to human visual system; (b12) performing weighted pooling of the $SSIM_A$ by using the contrast map to produce an approximation similarity index; (c12) performing weighted pooling of the $SSIM_E$ by using the contrast map to produce an edge similarity index; and (d12) combining the approximation similarity index from the step (b12) with the edge similarity index from the step (c12) to determine the SSIM score.

The step (a1) comprises: (a13) applying a low-pass filter and a high-pass filter on the image X; and the step (b1) comprises: (b13) applying a low-pass filter and a high-pass filter on the image Y.

In the embodiments of the invention, the step (a13) further comprises one or more of the following: (a14) applying a low-pass filter horizontally and a high-pass filter vertically on the image X; (b14) applying a high-pass filter vertically and a high-pass filter horizontally on the image X; (c14) applying a low-pass filter vertically and a high-pass filter horizontally on the image X; and (d14) applying a low-pass filter horizontally and a low-pass filter vertically on the image X.

In the embodiment of the invention, the step (b13) further comprises: (a15) applying a low-pass filter horizontally and a high-pass filter vertically on the image Y; (b15) applying a high-pass filter vertically and a high-pass filter horizontally on the image Y; (c15) applying a low-pass filter vertically and a high-pass filter horizontally on the image Y; and (d15) applying a low-pass filter horizontally and a low-pass filter vertically on the image Y.

Conveniently, the discrete wavelet transform may be one of a Haar transform, a Newland transform, or a wavelet transform using a Daubechies filter.

According to another aspect of the invention, there is provided a method for determining a measure of similarity between an image X and an image Y, having the same number of rows and columns of pixels, the method comprising: (a17) performing a two dimensional discrete wavelet decomposition of the image X, producing an approximation subband containing main content of the image X and three detail subbands, including a horizontal subband, a vertical subband, and a diagonal subband, the detail subbands containing fine edges of the image X; (b17) performing a two dimensional discrete wavelet decomposition of the image Y, producing an approximation subband containing main content of the image Y and three detail subbands including a horizontal subband, a vertical subband, and a diagonal subband, the detail subbands containing fine edges of the image Y; (c17) determining an approximation similarity measure, characterizing similarity between the main content of the image X and the main content of the image Y, by processing the approximation subband of the image X and the approximation subband of the image Y; (d17) aggregating the detail subbands of the image X, producing an aggregate for the image X; (e17) aggregating the detail subbands of the image Y, producing an aggregate for the image Y; (f17) determining an edge similarity measure, characterizing similarity between the fine edges of the image X and the fine edges of the image Y, by processing the aggregate for the image X and the aggregate for the image Y; and (g17) determining a Wavelet Structural Similarity (WSSIM) score as the measure of similarity between the image X and the image Y by processing the approximation similarity measure and the edge similarity measure.

The step (c17) comprises determining a structural similarity map $SSIM_A$ characterizing a difference between pixels in the approximation subband of the image X and corresponding pixels in the approximation subband of the image Y. The step (f17) comprises determining an edge structural similarity map $SSIM_E$ characterizing a difference between pixels in the aggregate for the image X and corresponding pixels in the aggregate for the image Y. The step (g17) comprises processing the $SSIM_A$ and the $SSIM_E$ to obtain the WSSIM score.

The step (d17) comprises: (a21) generating an edge map for the image X, including calculating weighted norm of the detail subbands of the image X; and the step (e17) comprises: (b21) generating an edge map for the image Y, including calculating weighted norm of the detail subbands of the image Y.

The step (g1) of the method further comprises: (a22) generating a contrast map, including assigning corresponding values to the pixels of the image X and the image Y according to their respective importance to human visual system; (b22) performing weighted pooling of the $SSIM_A$ by using the contrast map to produce an approximation similarity index; (c22) performing weighted pooling of the $SSIM_E$ by using the contrast map to produce an edge similarity index; and (d22) combining the approximation similarity index from the step (b22) with the edge similarity index from the step (c22) to determine the SSIM score.

In the embodiments of the invention, the step (a17) comprises applying a low-pass filter and a high-pass filter on the image X; and the step (b17) comprises applying a low-pass filter and a high-pass filter on the image Y.

A computer readable storage medium, having a computer readable program code instructions stored thereon, which, when executed by a computer, perform the steps of the method as described above is also provided.

According to yet another aspect of the invention, there is provided a system for determining a measure of similarity between an image X and an image Y, having the same number of rows and columns of pixels, the system comprising: a processor, and a computer readable storage medium having computer readable instructions stored thereon, which, when executed by the processor, form the following: (a25) a First Multiresolution Decomposition Module, applying a one level multiresolution decomposition to the image X, producing an approximation subband containing main content of the image X and detail subbands containing fine edges of the image X; (b25) a Second Multiresolution Decomposition Module, applying said one level multiresolution decomposition to the image Y, producing an approximation subband containing main content of the image Y and detail subbands containing fine edges of the image Y; (c25) a module for determining an approximation similarity measure, characterizing similarity between the main content of the image X and the main content of the image Y, by processing the approximation subband of the image X and the approximation subband of the image Y; (d25) a module for aggregating the detail subbands of the image X, producing an aggregate for the image X; (e25) a module for aggregating the detail subbands of the image Y, producing an aggregate for the image Y; (f25) a module for determining an edge similarity measure, characterizing similarity between the fine edges of the image X and the fine edges of the image Y, by processing the aggregate for the image X and the aggregate for the image Y; and (g25) a SSIM Processing Module for determining a Structural Similarity (SSIM) score as the measure of similarity between the image X and the image Y by processing the approximation similarity measure and the edge similarity measure.

The system further comprises: (a26) a First Repository storing the approximate and the detail subbands of the image X; and (b26) a Second Repository storing the approximate and the detail subbands of the image Y. The First Multiresolution Decomposition Module and the Second Multiresolution Decomposition Module comprise means for performing one of discrete wavelet transform (DWT) or discrete cosine transform (DCT); and wherein: the module (g25) comprises a module determining a Wavelet Structural Similarity (WSSIM) score provided the DWT has been applied in the First Multiresolution Decomposition Module (a25); or the module (g25) comprises a module determining a Cosine Structural Similarity (CSSIM) score provided the DCT has been applied in the First Multiresolution Decomposition Module (a25).

In the embodiments of the invention, the approximation similarity measure comprises one of a structural similarity map $SSIM_A$ or a structural similarity index based on a Visual Information Fidelity (VIF) method, the $SSIM_A$ or the structural similarity index characterizing a difference between pixels in the approximate subband of the image X and corresponding pixels in the approximation subband in the image Y; and wherein: the module (c25) comprises one of an Approximation SSIM Map Computation Module provided the $SSIM_A$ has been used as the approximation similarity measure, or an Approximation SSIM Index Computation module provided that the structural similarity index has been used as the approximation similarity measure.

In the embodiments of the invention, the edge similarity measure comprises one of an edge structural similarity map $SSIM_E$ or an edge structural similarity index based on a Visual Information Fidelity (VIF) method, the $SSIM_E$ and the edge structural similarity index characterizing a difference between pixels in the aggregate for the image X and corresponding pixels in the aggregate for the image Y and wherein: the module (f25) comprises one of an Edge SSIM Map Generation Module for determining the $SSIM_E$ provided the $SSIM_E$ has been used as the edge similarity measure, or an Edge SSIM Index Generation Module for determining the edge structural similarity index provided the edge structural similarity index has been used as the edge similarity measure.

The detail subbands of the image X include one or more of a horizontal subband containing horizontal fine edges, a vertical subband containing vertical fine edges, and a diagonal subband containing diagonal fine edges; and the detail subbands of the image Y include one or more of a horizontal subband containing horizontal fine edges, a vertical subband containing vertical fine edges, and a diagonal subband containing diagonal fine edges.

The module (d25) comprises: (a31) a First Edge Map Generation Module, generating an edge map for the image X, including calculating weighted norm of the detail subbands of the image X; and the module (e25) comprises: (b31) a Second Edge Map Generation Module, generating an edge map for the image Y, including calculating weighted norm of the detail subbands of the image Y.

The module (g25) comprises: (a32) a Contrast Map Generation Module, generating a contrast map, including assigning corresponding values to the pixels of the image X and the image Y according to their respective importance to human visual system; (b32) an Approximation Similarity Index Computation Module, performing weighted pooling of the $SSIM_A$ by using the contrast map, to produce an approximation similarity index; (c32) an Edge Similarity Index Computation Module, performing weighted pooling of the $SSIM_E$ by using the contrast map to produce an edge similarity index; and (d3) a SSIM Score Computation Module for combining the approximation similarity index from the (b32) with the edge similarity index from the (c32) to determine the SSIM score.

The First Multiresolution Decomposition Module comprises: (a33) a First Low-Pass Filter, filtering out low spatial frequencies of the image X; and (b33) a First High-Pass Filter, filtering out high spatial frequencies of the image X. The Second Multiresolution Decomposition Module comprises: (a34) a Second Low-Pass Filter, filtering out low spatial frequencies of the image Y; and (b34) a Second High-Pass Filter, filtering out high spatial frequencies of the image Y.

Thus, improved methods and system for determining structural similarity between images have been provided.

BRIEF DESCRIPTION OF THE DRAWINGS

Further features and advantages of the invention will be apparent from the following description of the embodiment, which is described by way of example only and with reference to the accompanying drawings, in which:

FIG. 9 presents a performance comparison of image quality assessment models including all 779 distorted images;

DESCRIPTION OF THE EMBODIMENTS OF THE INVENTION

Glossary

Figure 1:
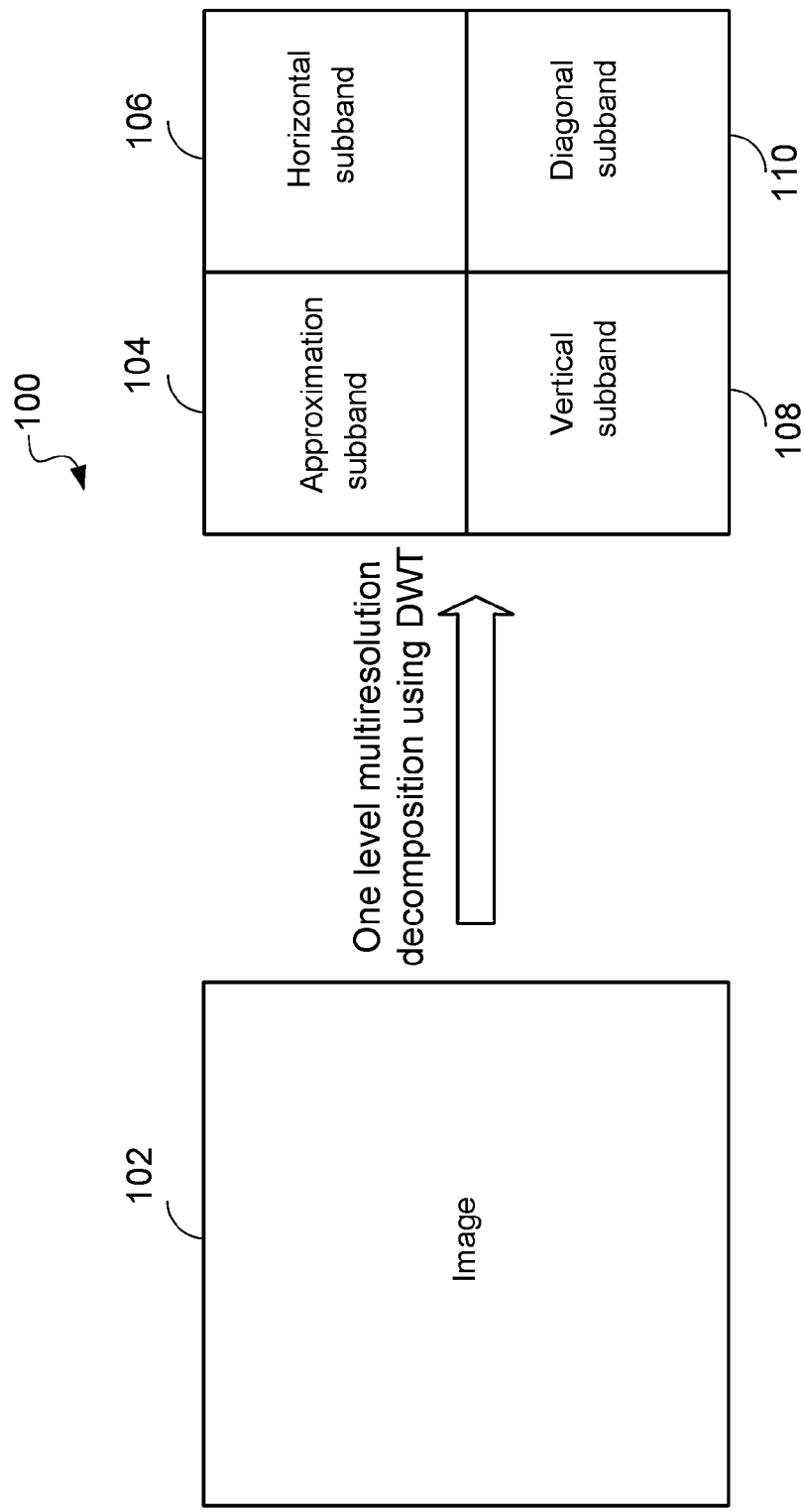
FIG. 1 presents the basic concepts of One Level 2D multiresolution decomposition using discrete Wavelet transform of prior art.
Figure 2:
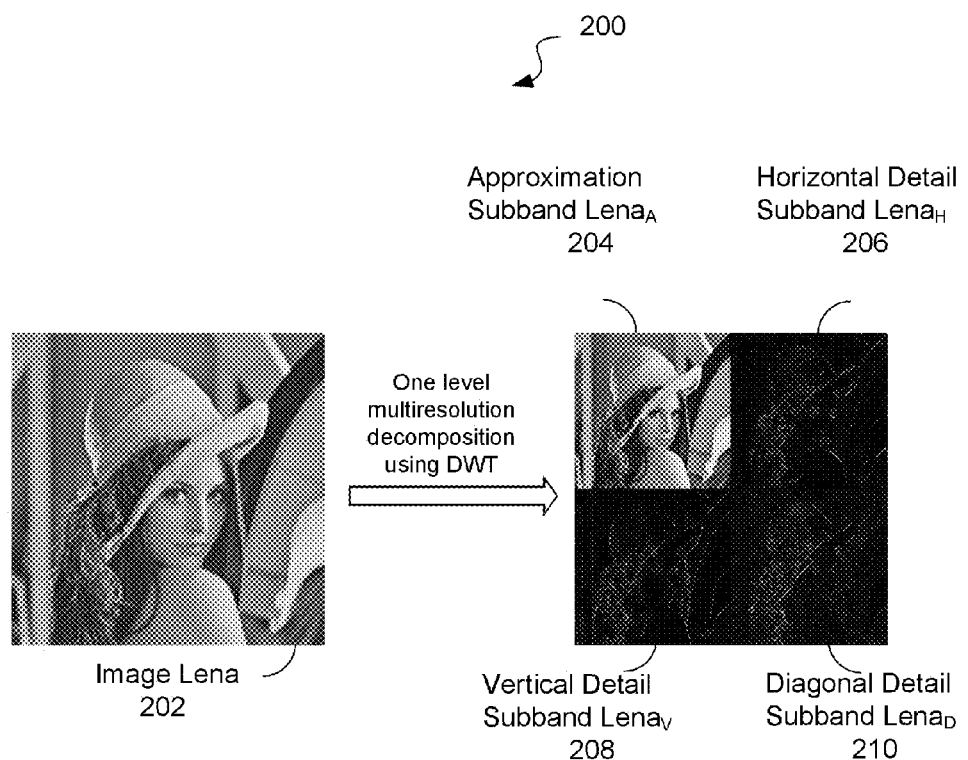
FIG. 2 presents and example 200 of One Level 2D multiresolution decomposition using discrete Wavelet transform of prior art for a sample image.

Approximation subband: subband containing main content of an image

Approximation similarity index: measure of similarity of the approximation subband of image X and the approximation subband of image Y Approximation similarity measure: measure of image quality that provides a structural similarity index (e.g., when VIF is used for quality assessment) or a structural similarity map (e.g., when $SSIM_{W\&B}$ is used for quality assessment)

Contrast map: weighting function for automatically assigning weights to pixels in different regions of an image based on their visual importance Correlation coefficient: a statistical measure computed between two image patches based on Pearson product-moment correlation coefficient CSSIM score: measure of similarity between two images achieved with a DCT transform used for image decomposition.

Detail subbands: subbands containing fine edges of an image

Diagonal detail subband: subband containing fine diagonal edges of an image

Discrete wavelet transform (DWT): transform applied to an image to separate its low frequency components from its high frequency components Discrete Cosine Transform (DCT): discrete cosine transform used for multiresolution decomposition of images Edge-map: characterizes the fine edges of an image and is determined as the mean square of horizontal, vertical, and diagonal detail subbands of the image obtained after one-level discrete wavelet decomposition.

Edge structural similarity map: characterizes the similarity of edges of two images Edge similarity index: measure of similarity between the approximation subbands of two images Gaussian sliding window: a set of N coefficients with unit sum and Gaussian probability distribution.

Horizontal subband: subband containing fine horizontal edges of an image

Multiresolution decomposition: a transform applied on digital images for generating subbands, one of which contains the low frequency main content of original image and other subbands contain fine edges of the original image.

Structural SIMilarity (SSIM): an accurate measure of image quality that captures similarity between two images and can be computed with acceptable computational complexity compared to other image quality metrics.

$SSIM_{W\&B}$: SSIM method of quality assessment proposed by Z. Wang and A. C. Bovik Structural similarity index: an intermediary similarity value, which is used for calculating the SSIM score when VIF is used for visual quality assessment of images Structural similarity map: an intermediary similarity value, which is used for calculating the SSIM score when $SSIM_{W\&B}$ is used for visual quality assessment of images SSIM score: the final similarity value produced by the embodiments of the present invention for visual quality assessment of images Visual Information Fidelity (VIF): a method of quality assessment for images proposed by H. R. Sheikh and A. C. Bovik Vertical subband: subband containing fine vertical edges of an image WSSIM score: measure of similarity between two images based on SSIM achieved with a DWT technique used for image decomposition.

The embodiments of the present invention provide a method and system for determining a structural similarity (SSIM) score, to be further referred to as SSIM method and system in this application.

The embodiments of the invention determines a quality metric, SSIM score, which measures the similarity between an image X and an image Y. In certain applications, which include transcoding and image compression, the image X may be an original image, and the image Y may be a "distorted" image obtained after the processing of image X.

A multiresolution decomposition of an image in the form of a discrete wavelet transform has been used in one embodiment of the invention. In the first step, an image decomposition is performed by applying one level two dimensional DWT transform to both the image X and the image Y. As a result, four subbands are obtained for each of the images X and Y. The reasons for using a discrete wavelet transform in the proposed quality metric of the embodiment of the invention include the following:

After applying the discrete wavelet transform, each subband keeps a basic outline of the image X, therefore the structure information regarding the image is not lost in the wavelet transformed image;

Low frequency component, which is the main content of the image, is separated from image details after wavelet transformation; thus, the higher importance main content and lower importance detail content of the images can be analyzed separately to achieve higher performance;

DWT has been widely used in image/video processing applications; and

DWT is relatively simple and has a fast implementation; therefore it does not impose heavy computational overhead for computing the quality metric.

Figure 3:
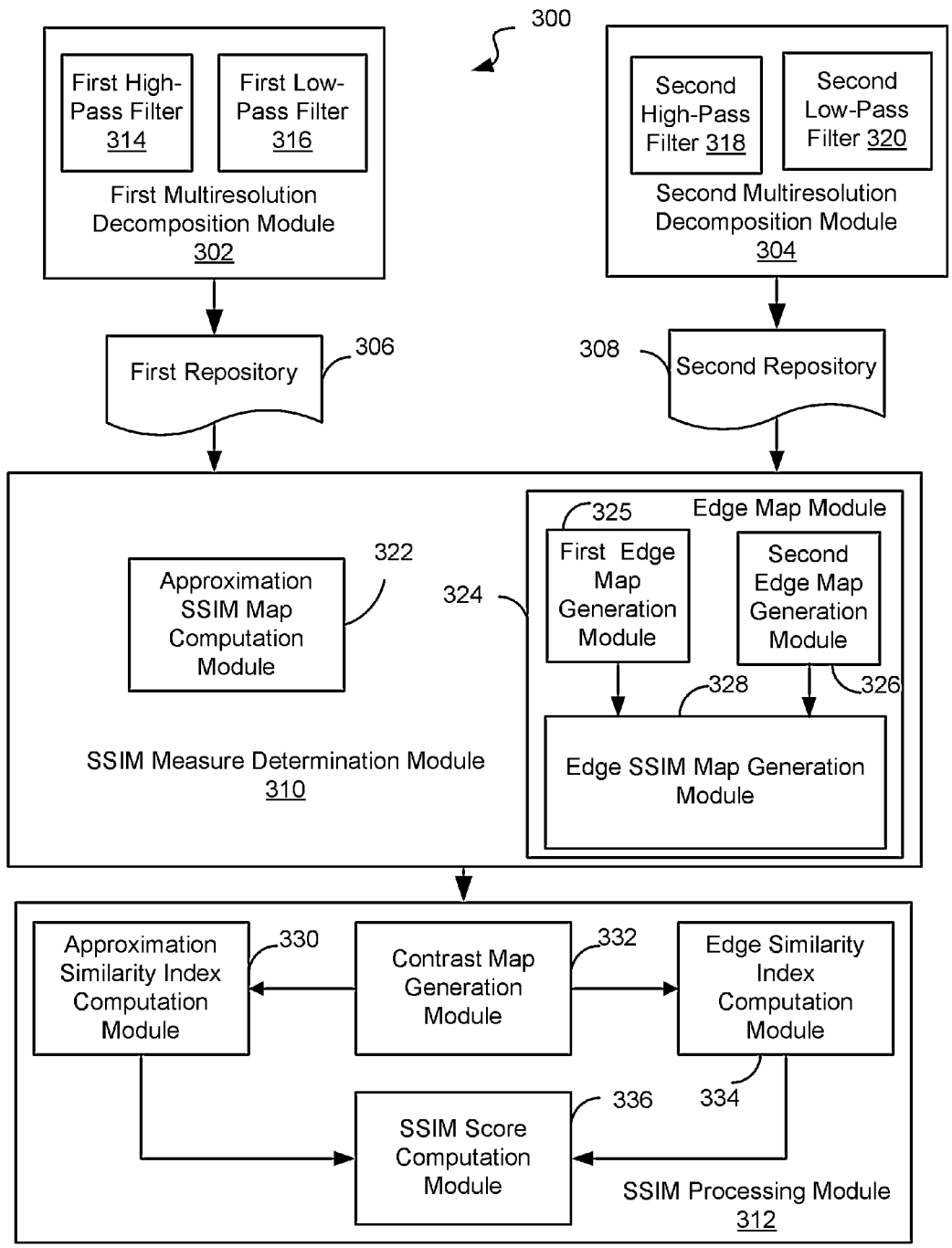
FIG. 3 displays functional components of a system of the embodiment of the invention.

A system 300 for computing the SSIM score is displayed in FIG. 3.

The system 300 includes a general purpose or specialized computer having a CPU and a computer readable medium, e.g., memory, DVD, CD-ROM, floppy, magnetic tape or other storage medium, having computer readable instructions stored thereon, which, when executed by the CPU, form modules of the system 300 as described in detail below. Alternatively, the system 300 can include specialized dedicated hardware or a combination of firmware and a specialized computer having a computer readable storage medium having computer readable instructions stored thereon for execution by the CPU for forming modules of the system 300 as described below. Modules of the system 300, namely modules 302, 304, 310, 312, 314, 316, 318, 320, 322, 324, 325, 326, 328, 330, 332, 334 and 336 include a firmware or, alternatively, computer readable instructions stored in a computer readable storage medium for execution by a processor.

The system 300 comprises a First Multiresolution Decomposition Module 302, a Second Multiresolution Decomposition Module 304, a First Repository 306, a Second Repository 308, a SSIM Measure Determination Module 310 and a SSIM Processing Module 312. Operations performed by the First Multiresolution Decomposition Module 302 and the Second Multiresolution Decomposition Module in one embodiment are different from the operations performed by these modules in an alternative embodiment. Operations performed by all the other modules are the same for both embodiments. In one embodiment, the First Multiresolution Decomposition Module 302 performs a one level multiresolution decomposition (e.g., DWT) of the image X producing the approximation subband 104 for image X, the horizontal subband 106 for image X, the vertical subband 108 for image X and a diagonal subband 110 for image X. The Second Multiresolution Decomposition Module 304 performs a one level multiresolution decomposition (e.g., DWT) of the image Y producing the approximation subband 104 for image Y, the horizontal subband 106 for image Y, the vertical subband 108 for image Y and the diagonal subband 110 for image Y. In the alternative embodiment, instead of performing a one level DWT, a discrete cosine transform is applied for decomposing images X and Y.

The First Multiresolution Decomposition Module 302, a Second Multiresolution Decomposition Module 304 comprise means for performing DWT in one embodiment, and means for performing DCT in the alternative embodiment.

The means for performing DWT and means for performing DCT include a general purpose or specialized computer having a CPU and a computer readable medium, e.g., memory, DVD, CD-ROM, floppy, magnetic tape or other storage medium, having computer readable instructions for respectively performing DWT or DCT stored thereon for execution by the CPU. Alternatively, said means can include specialized dedicated hardware or a combination of firmware and a specialized computer having a computer readable storage medium having computer readable instructions stored thereon for execution by the CPU for achieving the functionality of DWT or DCT.

The approximation subband 104 for image X and the three details subbands for image X are stored in a First Repository 306 whereas the approximation subband 104 for image Y and the three detail subbands for image Y are stored in a Second Repository 308. The First Repository 306 and the Second Repository 308 comprise a computer readable storage medium, e.g., memory, hard drive, DVD, CD-ROM, solid state disk, etc., comprising computer readable instructions stored thereon. The SSIM Measure Determination Module 310 processes the approximation subbands 104 and the detail subbands for image X and image Y stored in the First Repository 306 and the second Repository 308 respectively and passes on its output to the SSIM Processing Module 312 that determines the SSIM score.

The First Multiresolution Decomposition Module 302 comprises a First High-Pass Filter 314 and a First Low-Pass Filter 316 that are applied on image X for generating the approximation subband 104 of image X and the detail subbands of image X. The Second Multiresolution Decomposition Module 302 comprises a Second High-Pass Filter 318 and a Second Low-Pass Filter 320 that are applied on image Y for generating the approximation subband 104 of image Y and the detail subbands of image Y.

The SSIM Measure Determination Module 310 comprises an Approximation SSIM Map Computation Module 322 determines an approximate similarity measure that characterizes similarity between the main contents of image X and image Y and an Edge Map Module 324 determines an edge similarity measure that characterizes similarity between the fine edges of the image X and the image Y. The Approximation SSIM Map Computation Module 322 determines a structural similarity map $SSIM_A$ between the approximation subband 104 of the image X stored in the in the First Repository 306 and the approximation subband 104 of the image Y stored in the Second Repository 308 as the approximation similarity measure.

Aggregation of the detail subbands of the image X and the image Y is performed by the embodiment of the invention. Modules for aggregating the detail subbands of the image X and aggregating the detail subbands of the image Y are included in the Edge Map Module 324, which, in turn, comprises a First Edge Map Generation Module 325, a Second Edge Map Generation Module 326 and an Edge SSIM Map Generation Module 328. The First Edge Map Generation Module 325 aggregates the detail subbands of image X stored in the First Repository 306 and generates an edge map for the image X, whereas the Second Edge Map Generation Module 326 aggregates the detail subbands of image Y stored in the Second Repository 308 and generates an edge map for the image Y. The Edge SSIM Map Generation Module 328 processes the edge maps generated by the First Edge Map Generation Module 325 and the second Edge Map Generation Module 326 to produce an edge structural similarity map $SSIM_E$ as the edge similarity measure.

In the embodiment of the invention, the aggregation of the details subbands includes generating an edge map for the image X, including calculating weighted norm of the detail subbands of the image X; and generating an edge map for the image Y, including calculating weighted norm of the detail subbands of the image Y as will be described in more detail below.

The SSIM Processing Module 312 comprises a Contrast Map Generation Module 332, an Approximation Similarity Index Computation Module 330, an Edge Similarity index Computation Module 334, and a SSIM Score Computation Module 336. The Contrast Map Generation Module 332 generates a contrast map, which is a weighting function that automatically assigns respective values to the pixels of the image X and the image Y according to their importance to the human visual system. The Approximation Similarity Index Computation Module 330 uses the contrast map to perform weighted pooling of $SSIM_A$ determined by the Approximation SSIM Map Computation Module 322 to produce an approximation similarity index $S_A$, whereas the Edge Similarity index Computation Module 334 uses the contrast map to perform pooling of $SSIM_E$ determined by the Edge SSIM Map Generation Module 328 producing an edge similarity index $S_E$. The approximation similarity index and the edge similarity index are used by the SSIM Score Computation Module 336 to determine the SSIM score. In one embodiment of the invention, the First Multiresolution Decomposition Module 302 and the Second Multiresolution Decomposition Module 304 apply a one level discrete wavelet transform to the images X and Y respectively, and the Wavelet Structural Similarity (WSSIM) score is computed by the SSIM Score Computation Module 336. In the alternative embodiment, the First Multiresolution Decomposition Module 302 and the Second Multiresolution Decomposition Module 304 apply a non-overlapping 2×2 block discrete cosine transform (DCT) to the images X and Y respectively and reorder and group the DCT coefficients to produce four different subbands, and a Cosine Structural Similarity (CSSIM) score is computed by the SSIM Score Computation Module 336.

As mentioned earlier, in one embodiment the WSSIM score is computed whereas in the alternative embodiment the CSSIM score is computed. Accordingly, in one embodiment of the invention, the SSIM Measure Determination Module 310 is referred to as a WSSIM Measure Determination Module, while it is referred to as a CSSIM Measure Determination Module in the alternate embodiment. Similarly, the SSIM Score Computation Module 336 is referred to as a WSSIM Score Computation Module in one embodiment, and a CSSIM Score Computation Module in the alternative embodiment.

Figure 3A:
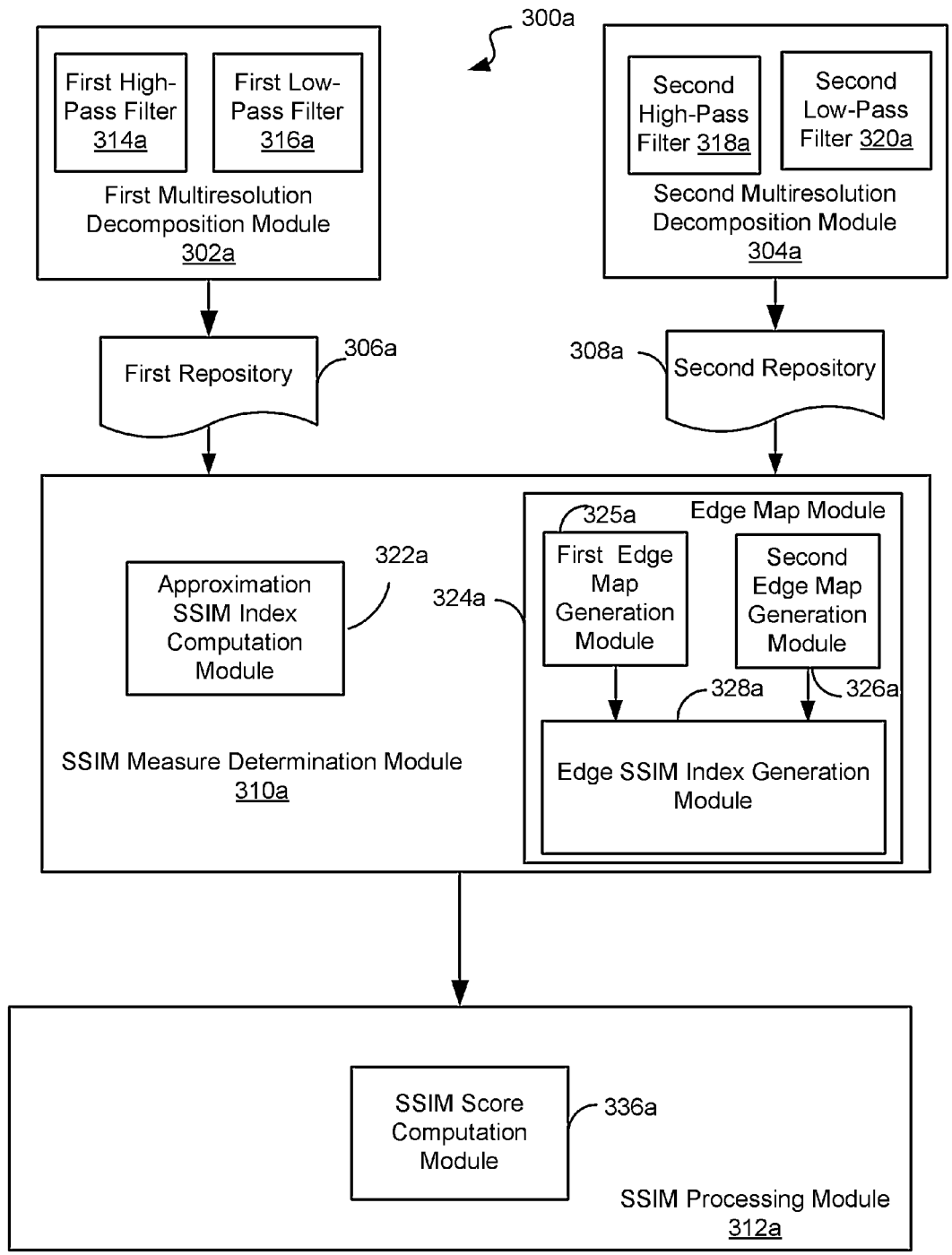
FIG. 3a displays functional components of a system of another embodiment of the invention using the VIF method.

In yet another embodiment of the invention a VIF method discussed by H. R. Sheikh, A. C. Bovik, in "Image Information and Visual Quality," IEEE Transactions on Image Processing, vol. 15, no. 2, pp. 430-444, February 2006, is used for computation of the SSIM score as illustrated by the system 300a displayed in FIG. 3a.

The difference between the system 300 of FIG. 3 described above and the system 300a of FIG. 3a is that the system 300a uses a structural similarity index as the approximation similarity measure and the edge structural similarity index as the edge similarity measure. Modules 302a, 304a, 306a, 308a, 325a, 326a and 336a of the system 300a are similar to modules 302, 304, 306, 308, 325, 326 and 336 of the system 300 respectively. The difference between module 322a of system 300a and module 322 of system 300, and the difference between module 328a of system 300a and module 328 of system 300 is that the VIF method is used in the modules 322a and 328a of the system 300a, whereas the $SSIM_{W\&B}$ is used in the modules 322 and 328 of the system 300. The Approximation Similarity Computation Module 322a determines an approximation similarity measure called structural similarity index, and the Edge Similarity Index Generation Module 328a determines an edge similarity measure called edge structural similarity index. When the VIF method is used, outputs of modules 322a and 328a are numerical values instead of two dimensional maps. Therefore, the modules 330, 332, and 334 of FIG. 3 are no longer needed in the system 300a of FIG. 3a.

The system 300a of the alternative embodiment of the invention includes a general purpose or specialized computer having a CPU and a computer readable medium, e.g., memory, hard drive, DVD, CD-ROM, floppy, magnetic tape, soled state disk, or other storage medium, having computer readable instructions stored thereon for execution by the CPU, to form modules of the system 300a. Alternatively, the system can be implemented in firmware, or combination of firmware and a specialized computer having a computer readable storage medium. Each of the First Repository 306a and the Second Repository 308a comprises computer readable instructions that are stored in a computer readable storage medium. The modules of the system 300a, namely modules 302a, 304a, 310a, 312a, 314a, 316a, 318a, 320a, 322a, 324a, 325a, 326a, 328a and 336a include a firmware or, alternatively, computer readable instructions stored in a computer readable storage medium for execution by a processor.

Figure 4:
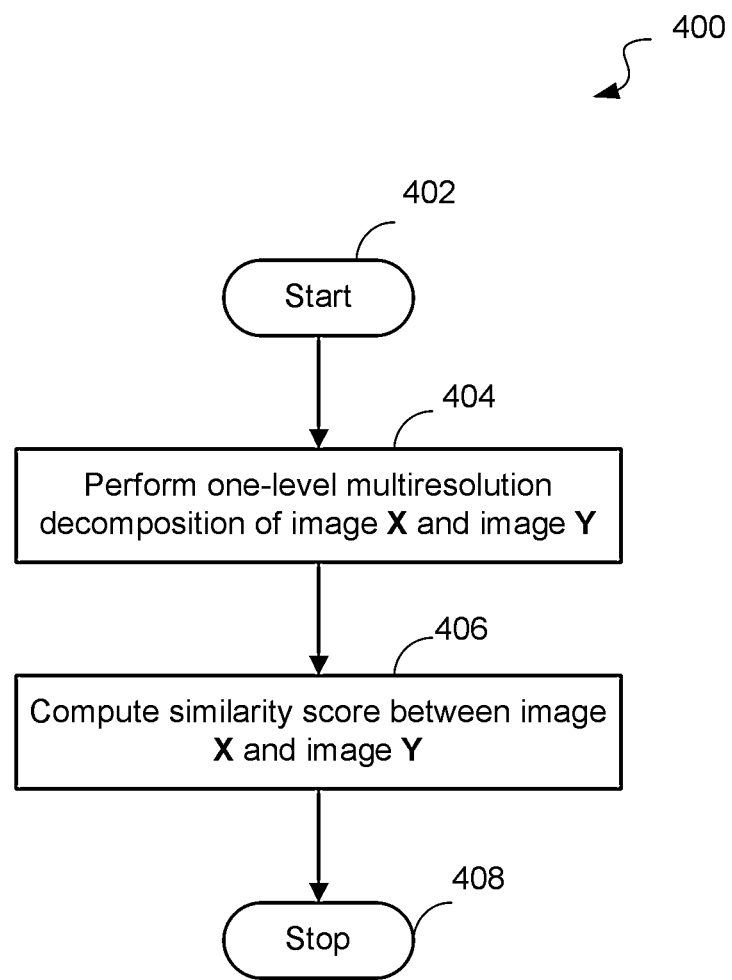
FIG. 4 presents a flow chart for illustrating steps of the method for determining a WSSIM Score in accordance with the preferred embodiment of the invention.

A method for determining the SSIM score according to the embodiment of the invention is described in detail with the help of FIG. 4. Upon start (box 402), the procedure 400 performs a one level two dimensional multiresolution decomposition, e.g. DWT, of both the image X and the image Y producing an approximation subband and a variable number (zero to three) of detail subbands for each of the images X and Y (box 404). The number of detail subbands produced depends on a required accuracy associated with measuring the similarity between image X and image Y. The number of detail subbands is increased from 0 to 1, 2 or 3 as the required accuracy increases. The number of detail subbands affects the accuracy of the contrast map and the edge map. The horizontal and vertical detail subbands have nearly equal importance and their impact on the accuracy of the method are more than that of the diagonal detail subband. So, if two detail subbands are to be selected to form the edge map, the horizontal and the vertical detail subbands are recommended to be used. Forming the edge map with less than three detail subbands will reduce the accuracy of the edge map, the edge structural similarity map, the contrast map, and consequently the SSIM score, however the complexity of computations will also be reduced accordingly, which may be acceptable in certain applications.

The two dimensional multiresolution decomposition is accomplished by applying one of the discrete wavelet transforms that include a Haar transform, a Newland transform, or a wavelet transform using a Daubechies filter.

With one level decomposition, the approximation subbands are large enough compared to the original images to provide accurate image statistics. Using the approximation subbands the procedure 400 computes a similarity score, WSSIM, between the image X and the image Y (box 404) and exits (box 406).

Figure 5:
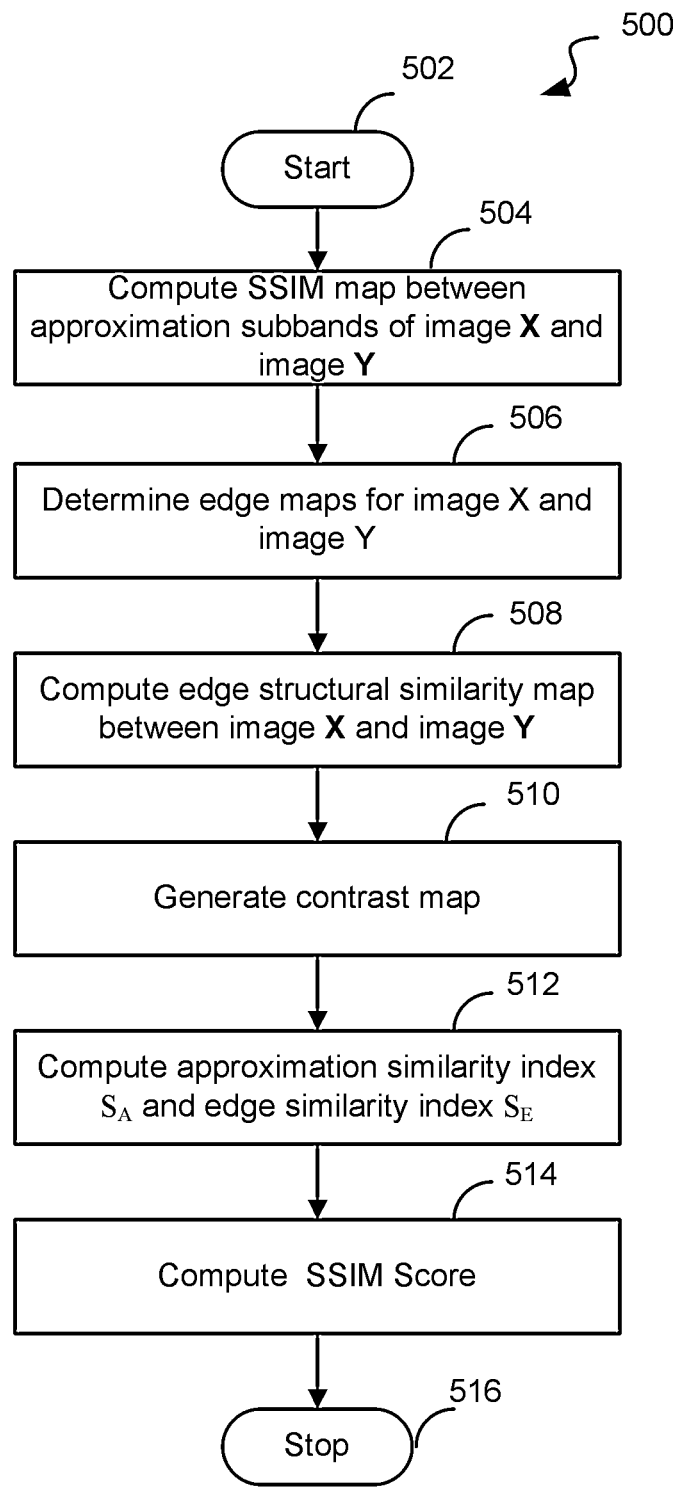
FIG. 5 presents a flow chart for illustrating the step "Compute similarity score between image X and image Y" of the flow chart of FIG. 4.

Details of operations performed in the box 406 of FIG. 4 are explained further with the help of flowchart 500 displayed in FIG. 5. Upon start (box 502), the procedure 500 computes the structural similarity map between the approximation subbands of the image X and image Y producing $SSIM_A$ (box 504). Edge maps for the images X and Y are determined next (box 506). The edge map for an image is used to capture the fine-edge structures of the image. After determining the edge maps, the procedure 500 computes the edge structural similarity map, $SSIM_E$, between the image X and the image Y (box 508) and generates a contrast map (box 510). The contrast map is a weighting function which automatically assigns values to pixels in images according to their importance for human visual system. The procedure 500 then computes the similarity between the image X and the image Y (box 512): $S_A$ is an approximation similarity index and $S_E$ is an edge similarity index. In the next step 514, the procedure 500 combines $S_A$ and $S_E$ to compute the SSIM score (box 514) and exits (box 516). Please note that a DWT transform is used in box 404 of FIG. 4 in one embodiment of the invention. This results in the WSSIM score being computed in box 514.

Further details of the method of FIG. 5 are presented next.

In box 504, the procedure 500 computes the $SSIM_A$, the structural similarity map between the approximation subbands of the image X and the image Y. This SSIM map is called structural similarity map $SSIM_A$. For each image patch $x_A$ and $y_A$ (having N pixels) within the approximation subbands of X and Y, $SSIM_A$ is computed as follows:

$$SSIM_A(x_A, y_A) = SSIM_{W\&B}(x_A, y_A) \tag{1}$$

The structural similarity map is computed by using the method disclosed by Z. Wang, A. C. Bovik, H. R. Sheikh and E. P. Simoncelli, in "Image Quality Assessment: From Error Visibility to Structural Similarity," IEEE Transactions on Image Processing, vol. 13, no. 4, pp. 600-612, April 2004.

In box 506, the procedure 500 performs the aggregation of the details subbands of each image, including determining an edge map that is defined for each image X and Y using the mean square of the detail subbands of the image X and image Y respectively.

$$X_E(m,n) = \frac{X_H^2(m,n) + X_V^2(m,n) + X_D^2(m,n)}{3} \tag{2}$$

$$Y_E(m,n) = \frac{Y_H^2(m,n) + Y_V^2(m,n) + Y_D^2(m,n)}{3} \tag{3}$$

$X_E$ and $Y_E$ represent the edge maps of X and Y respectively; (m,n) shows the sample position within the detail subbands; $X_H$, $X_V$, and $X_D$ denote the horizontal, subband 106, the vertical subband 108, and the diagonal subband 110 of image X respectively; $Y_H$, $Y_V$, and $Y_D$ denote the horizontal, subband 106, the vertical subband 108, and the diagonal subband 110 of image Y respectively. To simplify the computation of the edge maps, it is assumed that all detail subbands have the same sensitivity to HVS; but it is possible to compute edge maps using a weighted squared sum.

Please note that this step is not performed when the required accuracy is low and none of the detail subbands are generated. Depending on the required accuracy, when one or two subbands are generated, only the terms $X_H(m,n)$ and $Y_H(m,n)$ that correspond to the horizontal detail subbands, and/or $X_V(m,n)$ and $Y_V(m,n)$ that correspond to the vertical detail subbands contribute to the sum terms on the right hand side of equation (2) and equation (3).

In box 508, the procedure 500 computes the edge structural similarity map $SSIM_E$ that captures the similarity between the edge maps of the image X and the image Y. It is computed using the following formula:

$$SSIM_E(x_E, y_E) = \frac{2\sigma_{x_E, y_E} + c}{\sigma_{x_E}^2 + \sigma_{y_E}^2 + c} \tag{4}$$

$$c = (kL)^2, k \ll 1 \tag{5}$$

where $$\sigma_{x_E, y_E}$$

is the cross correlation between image patches $x_E$ of $X_E$ and $y_E$ of $Y_E$. It is computed as:

$$\sigma_{x_E, y_E} = \sum_{k=1}^{N} w_k (x_{E,k} - \mu_{x_E})(y_{E,k} - \mu_{y_E})$$

Parameters $\sigma_{x_E}^2$ and $\sigma_{y_E}^2$ are variances of $x_E$ and $y_E$ respectively; k is a small constant; and L is a dynamic range of pixels (255 for gray-scale images). The correlation coefficient and variances are computed in the same manner as presented by Z. Wang, A. C. Bovik, H. R. Sheikh and E. P. Simoncelli, in "Image Quality Assessment: From Error Visibility to Structural Similarity," IEEE Transactions on Image Processing, vol. 13, no. 4, pp. 600-612, April 2004. Since the edge map only forms fine-edge structures of an image and contains no luminance information, the luminance comparison part of the SSIM map described in the paper is omitted in the computation of the edge structural similarity map.

Please note that this step, which computes the edge structural similarity map, is not performed when the required accuracy is low and none of the detail subbands are generated.

In box 510, the procedure 500 generates a contrast map that is a weighting function which automatically assigns values to pixels according to their importance for the human visual system. Thus, perceptually important image structures receive higher values. In box 512, the contrast map is used for assigning weights to the SSIM$_A$ (computed in box 504) and SSIM$_E$ (computed in box 508) for SSIM map pooling performed in box 512.

It is known that the HVS is more sensitive to areas near the edges as described, e.g., by Z. Wang and A. C. Bovik in "Modern Image Quality Assessment", Morgan & Claypool, United States, 2006. Therefore, the pixels in the SSIM map near the edges should be given more importance. On the other hand, high-energy (or high-variance) image regions are likely to contain more information to attract the HVS as discussed by Z. Wang, X. Shang, "Spatial Pooling Strategies for Perceptual Image Quality Assessment," IEEE International Conference on Image Processing, Atlanta, pp. 2945-2948, October 2006. Thus, the pixels in a SSIM map within high-energy regions are more important and therefore should be assigned higher weights.

Based on these facts, a mean of image patches in the edge map is combined with the computed variance of image patches in the same position within the approximation subband to form a contrast map. Both the edge structural similarity map and the contrast map are computed within a local Gaussian sliding window, which is a square window that moves pixel-by-pixel over the entire edge map $X_E$ and the approximation subband $X_A$.

As described by Z. Wang, A. C. Bovik, H. R. Sheikh and E. P. Simoncelli, in "Image Quality Assessment From Error Visibility to Structural Similarity," IEEE Transactions on Image Processing, vol. 13, no. 4, pp. 600-612, April 2004, a Gaussian sliding window W={$w_k$|k=1, 2, . . . , N}, with a standard deviation of 1.5 samples, normalized to a unit sum is used.

Accordingly, the contrast map is computed by using the following formulae:

$$\text{Contrast}(x_E, x_A) = \left(\mu_{x_E} \sigma_{x_A}^2\right)^{0.1} \quad (6)$$

$$\sigma_{x_A}^2 = \sum_{k=1}^{N} w_j (x_{A,k} - \mu_{x_A})^2 \quad (7)$$

$$\mu_{x_E} = \sum_{k=1}^{N} w_k x_{E,k}, \; \mu_{x_A} = \sum_{k=1}^{N} w_k x_{A,k} \quad (8)$$

Please note that when the edge map is formed using less than three detail subbands, the accuracy and efficiency of the contrast map decreases and its pooling effect reduces to simple averaging.

Please note that the contrast map exploits the original image statistics to form the weighted function for SSIM map pooling.

Figure 7:
FIG. 7 shows an example image X, which is called lighthouse.
Figure 8:
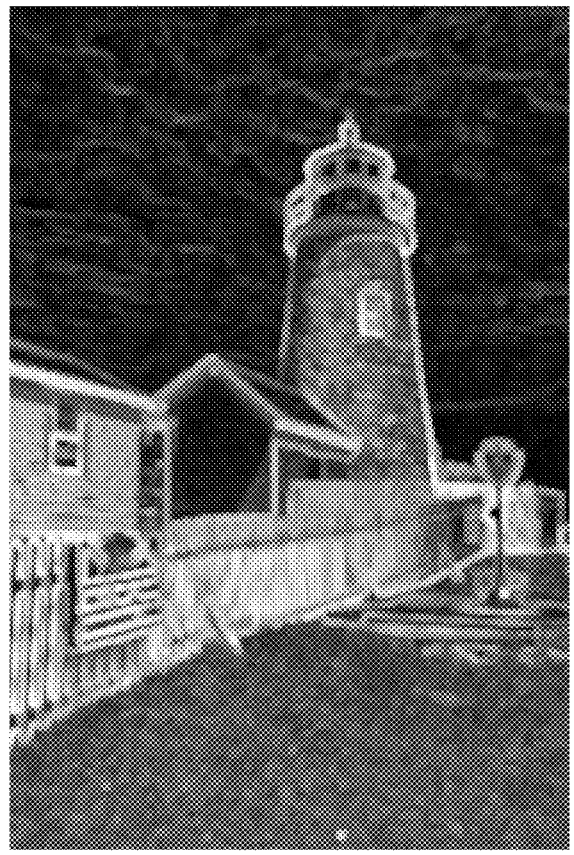
FIG. 8 shows a contrast map for the example image X of FIG. 7.

An example image 700 and its contrast map 800 are shown in FIG. 7 and FIG. 8 respectively. The sample values of the contrast map are scaled between [0,255] for easy observation. FIG. 8 demonstrates this resized contrast map, obtained with the help of equation (6), for the example image 800. As can be seen in FIG. 7 and FIG. 8, the contrast map clearly shows the edges and the image structures that are important to the HVS. Brighter (higher) sample values in the contrast map indicate image structures, which are more important to the HVS and play an important role in judging image quality.

In box 512, the procedure 500 performs SSIM map pooling to compute the $S_A$ and $S_E$. The contrast map generated by using equation (6) is used for weighted pooling of the SSIM$_A$ computed by using equation (1) and the SSIM$_E$ computed by using equation (4). The following formula set is used in pooling of SSIM$_A$ and SSIM$_E$ to compute $S_A$ and $S_E$ that are the approximation similarity index and the edge similarity index respectively.

$$S_A = \frac{\sum_{j=1}^{M} \text{Contrast}(x_{E,j}, x_{A,j}) \cdot SSIM_A(x_{A,j}, y_{A,j})}{\sum_{j=1}^{M} \text{Contrast}(x_{E,j}, x_{A,j})} \quad (9)$$

$$S_E = \frac{\sum_{j=1}^{M} \text{Contrast}(x_{E,j}, x_{A,j}) \cdot SSIM_E(x_{E,j}, y_{E,j})}{\sum_{j=1}^{M} \text{Contrast}(x_{E,j}, x_{A,j})} \quad (10)$$

where, $x_{E,j}$, $y_{E,j}$, $x_{A,j}$, and $y_{A,j}$ are image patches in the j-th local window that is a Gaussian sliding window; M is the number of samples in the respective SSIM maps. Please note that as the Gaussian sliding window moves pixel-by-pixel, it determines the local image patches. The j-th local window corresponds to the j-th image patch within the structural similarity map.

In box 514, the procedure 500 computes the SSIM score. The approximation similarity index and the edge similarity index are combined to obtain the SSIM score which is an overall measure of image quality measuring the similarity between images X and Y. A linear relationship is used to obtain the SSIM score:

$$SSIM(X,Y) = \alpha S_A + (1-\alpha) S_E \quad (11)$$

$$0 < \alpha \leq 1$$

wherein SSIM (X,Y) gives the SSIM score in the range [0,1], and α is a constant. As the approximation subband contains the main image contents, α should be close to one to give the approximation similarity index much more weight. Using α=0.94 has been observed to produce an effective similarity score for a given library of images. Please note that in one embodiment of the invention, since a DWT decomposition is performed in box 404 of FIG. 4, the SSIM score is the WSSIM score.

Please note that $S_E$ is set to 0 and α to 1 when the required accuracy is low, and none of the detail subbands is taken into account for computing the similarity score.

In yet another embodiment of the invention, the VIF method is used for computing the similarity score between the image X and the image Y. The corresponding system 300a for this embodiment of the invention has been described in FIG. 3a.

The flowchart 400 presented in FIG. 4 describes the step of the method used for computing the similarity score by using the VIF method. The details of the operations performed in box 406 in the context of this embodiment are explained further with the help of flowchart 500a displayed in FIG. 5a.

Figure 5A:
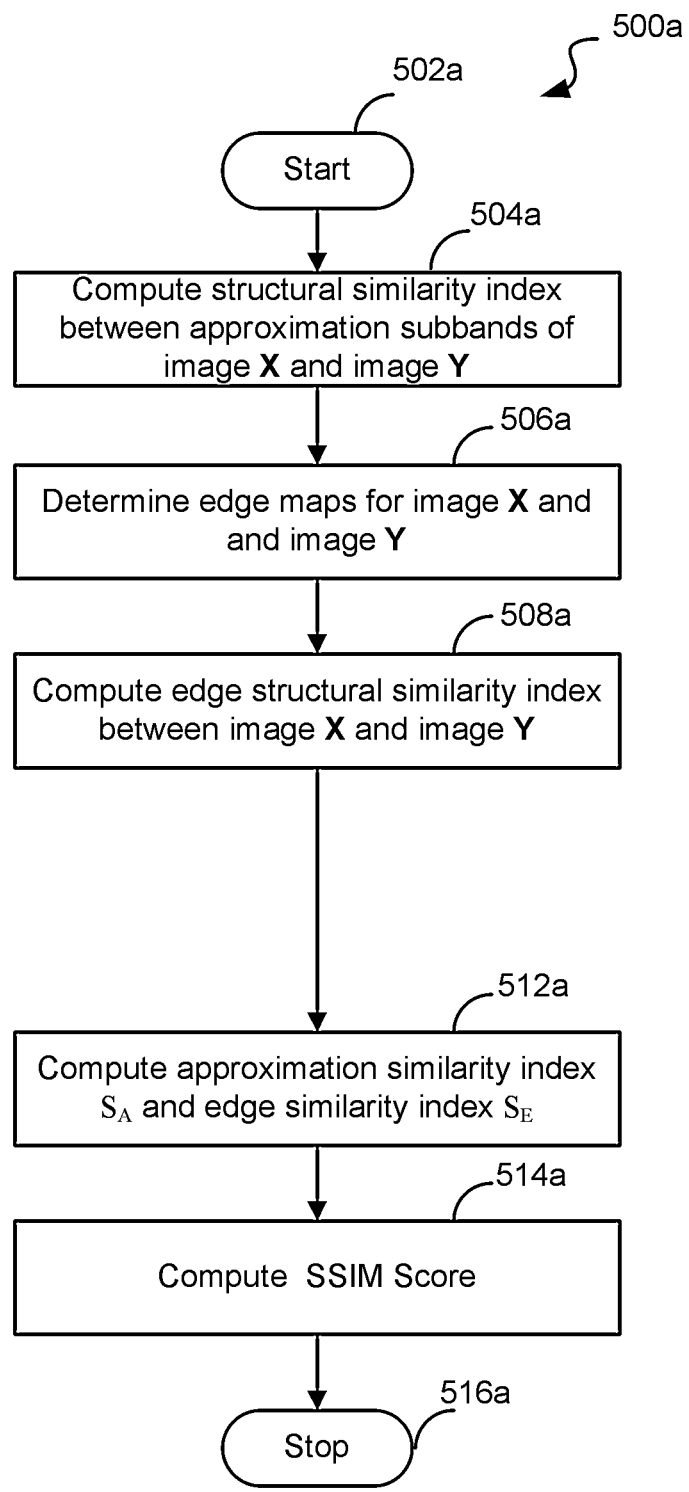
FIG. 5a presents a flow chart for illustrating the step "Compute similarity score between image X and image Y" of the flow chart of FIG. 4 for an alternate embodiment of the invention that using the VIF method.

The difference between the flowchart 500a of FIG. 5a and the flowchart 500 of FIG. 5 is that in the flowchart 500a the structural similarity index is used as the approximation similarity measure, and the edge structural similarity index is used as the edge similarity measure. Upon start (box 502a), the procedure 500a computes a structural similarity index between the approximation subbands of the image X and the image Y by using the VIF method (box 504a). Edge maps for the images X and Y are determined next (box 506a). After determining the edge maps, the procedure 500a computes an edge structural similarity index between the image X and the image Y (box 508a). The procedure 500 then computes the similarity between the image X and the image Y (box 512a): $S_A$ is an approximation similarity index and $S_E$ is an edge similarity index. Note that box 512a is simpler in comparison to the box 512 of the flowchart 500, since no contrast map is generated and a weighted pooling does not need to be performed. In the next step, the procedure 500a combines $S_A$ and $S_E$ to compute the SSIM score (box 514a), and exits (box 516a).

Figure 6:
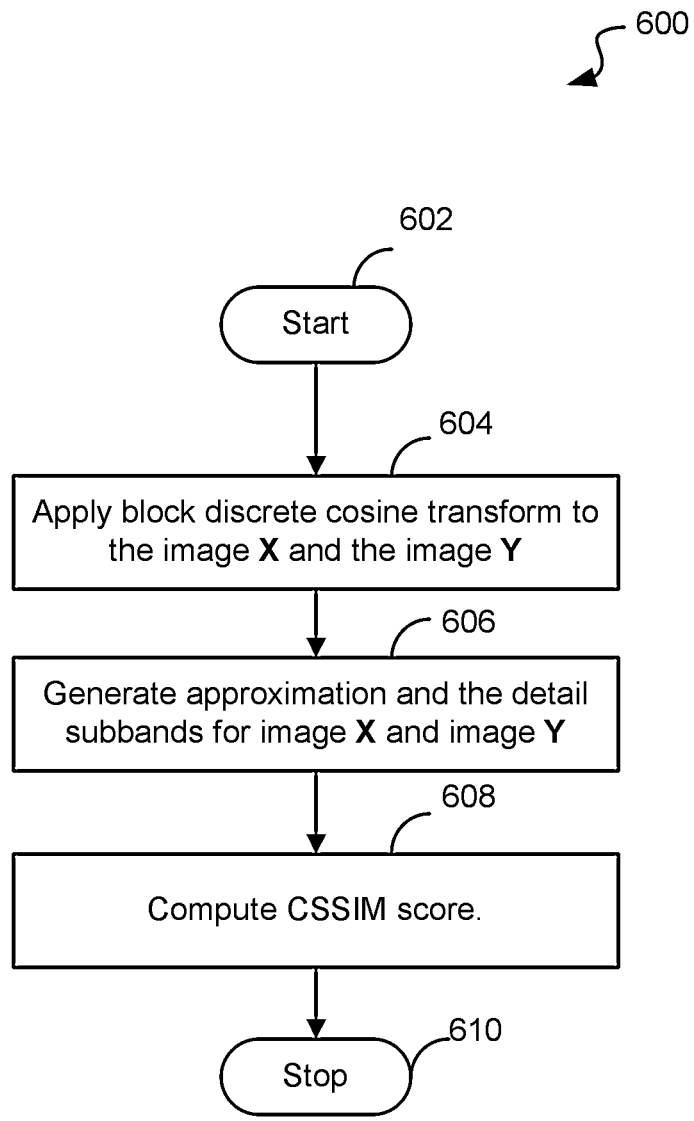
FIG. 6 presents a flow chart for illustrating steps of the method for computing a CSSIM Score in accordance with the alternate embodiment of the invention.

The steps of the SSIM method of the alternative embodiment using the DCT for image decomposition are explained with the help of FIG. 6. Upon start (box 602), the procedure 600 applies a 2×2 block discrete cosine transform to images X and Y (box 604). The DCT coefficients are re-organized to generate the approximation subband 104 and the detail subbands for each of the images (box 606). In the next step, the procedure 600 computes the CSSIM score (box 608) and exits (box 610). The procedure 500 displayed in FIG. 5 with regard to the one embodiment is used once again in the computation of the CSSIM score. The only difference with said one embodiment lies in the input for the procedure 500: the approximation and the detail subbands of the images X and Y are obtained by using different techniques, namely by applying 2×2 block DCT and then reordering the DCT coefficients, instead of applying DWT. In said one embodiment a DWT transform is used, whereas a DCT is used in the alternative embodiment. Thus, the SSIM score computed by procedure 500 for the alternative embodiment is referred to as the CSSIM score.

Computational Complexity of the WSSIM Method

It has been determined that the computational complexity of the WSSIM method of the embodiments of the present invention is less than that of the SSIM presented by Z. Wang, A. C. Bovik, H. R. Sheikh and E. P. Simoncelli, in "Image Quality Assessment: From Error Visibility to Structural Similarity," IEEE Transactions on Image Processing, vol. 13, no. 4, pp. 600-612, April 2004. As described by H. R. Sheikh, A. C. Bovik, in "Image Information and Visual Quality," IEEE Transactions on Image Processing, vol. 15, no. 2, pp. 430-444, February 2006, MATLAB (v7.5.0 R2007b) was used for performance evaluation. It was observed that the computation time for calculating the WSSIM score is, on average, about 65% of the computation time for SSIM calculation in the spatial domain. This test was conducted for a database of 1000 images. Various different aspects of the complexity of the WSSIM method are discussed next.

The resolution of the approximation subband and the edge map is a quarter of that of an image X. Lower resolutions mean that fewer computations are required to obtain SSIM maps for the WSSIM method. Because of the smaller resolution of the subbands in the wavelet domain, we can extract accurate local statistics with a smaller sliding window size. The spatial SSIM described by Z. Wang, A. C. Bovik, H. R. Sheikh and E. P. Simoncelli, in "Image Quality Assessment: From Error Visibility to Structural Similarity," IEEE Transactions on Image Processing, vol. 13, no. 4, pp. 600-612, April 2004 uses a window of size of 11×11 by default, while we show in the next section that the WSSIM method can provide accurate scores with a window of 4×4. A smaller window size reduces the number of computations required to obtain local statistics.

The most complex part of the WSSIM method seems to be wavelet decomposition. Since the sensitivity of the WSSIM score to different wavelets is negligible, a simple wavelet transform can be used to reduce complexity. We used the Haar wavelet transform for image decomposition. As Haar wavelet has the shortest filter length, it makes the filtering process simpler.

As can be seen from equation (6), the local statistics computed by equation (1) and equation (4) are used to form the contrast map. Therefore, generating the contrast map does not impose a large computational overhead.

Simulation Results and Analysis

Performance evaluation of the proposed WSSIM method was carried out using *LIVE Image Quality Assessment Database Release* 2 described by H. R. Sheikh, Z. Wang, L. Cormack, and A. C. Bovik, in "LIVE Image Quality Assessment Database Release 2", http://live.ece.utexas.edu/research/quality. This database includes 779 distorted images derived from 29 original color images using five types of distortion including JPEG compression, JPEG2000 compression, Gaussian white noise, Gaussian blurring, and the Rayleigh fast fading channel model. Realigned subjective quality data for the database were used in all experiments. This data is obtained by running realignment experiments, which are defined in the corresponding database and an associated paper, on the original Difference Mean Opinion Score (DMOS) scores of Release 2 data.

Three performance metrics were used to measure the performance of objective models. The first metric is the correlation coefficient (CC) between the DMOS and the objective model outputs after nonlinear regression. The correlation coefficient gives an evaluation of prediction accuracy. The five-parameter logistical function defined by H. R. Sheikh, M. F. Sabir, and A. C. Bovik, in "A Statistical Evaluation of Recent Full Reference Image Quality Assessment Algorithms," IEEE Transactions on Image Processing, vol. 15, no. 11, pp. 3441-3452, November 2006, for nonlinear regression was used. The second metric is the root mean square error (RMSE) between DMOS and the objective model outputs after nonlinear regression. The RMSE is considered as a measure of prediction consistency. The third metric is Spearman rank order correlation coefficient (ROCC), which provides a measure of prediction monotonicity.

In order to put the performance evaluation of the WSSIM method in proper perspective, the proposed WSSIM score is compared with other quality metrics, including Peak Signal to Noise Ratio (PSNR), Mean SSIM discussed by Z. Wang, A. C. Bovik, H. R. Sheikh and E. P. Simoncelli, in "Image Quality Assessment: From Error Visibility to Structural Similarity," IEEE Transactions on Image Processing, vol. 13, no. 4, pp. 600-612, April 2004, DWT-SSIM described by C-L. Yang, W-R. Gao, and L-M. Po, in "Discrete Wavelet Transform-based Structural Similarity for Image Quality Assessment," IEEE International Conference on Image Processing, San Diego, pp. 377-380, October 2008, and Visual Information Fidelity (VIF). In the simulation of the WSSIM method, the Haar wavelet, with k=0.03, and a Gaussian window size of 4×4 were used. Other quality assessment metrics, except for the VIF, were implemented and simulated with default parameters for the metrics described in the respective reference papers. In the simulations, an enhanced version of VIF implementation, which is described by H. R. Sheikh, Z. Wang, L. Cormack, and A. C. Bovik, in "LIVE Image Quality Assessment Database Release 2", http://live.ece.utexas.edu/research/quality was used. FIG. 9 displays the results of the performance comparison. As shown in the table in FIG. 9 WSSIM has the highest CC and ROCC in comparison to all the other metrics except for the VIF displaying the superiority of the WSSIM method. While the complexity of the WSSIM method is much lower than that of the VIF, its performance is very close to that of the enhanced VIF implementation. The previous results are again confirmed by RMSE values shown in the table of FIG. 9.

When the RMSE was computed for different $\alpha$ values in equation (11), it reached its minimum (global) for $\alpha$=0.94. This value of $\alpha$ meets our expectation that $\alpha$ should be close to 1. Because CC has a low sensitivity to small variations in $\alpha$, the proposed $\alpha$ does not affect the performance of the WSSIM method for quality prediction of a different image database.

To better understand the effect of wavelet transform in quality assessment, we considered a mean $SSIM_A$ as a separate objective quality assessment model. Note that this corresponds to the situation when none of the detail subbands is used in computation of the WSSIM score. The mean $SSIM_A$ has an even lower complexity than the WSSIM method. It can be seen from FIG. 9 that the CC value for the mean $SSIM_A$ (0.9412) is higher than the CC value for DWT-SSIM (0.9346). This shows that one can compute the similarity of images with very good precision by just considering their first-level approximation subband. The reason is that most of useful image information is concentrated in the first-level approximation subband. As mentioned earlier, neglecting a luminance comparison in calculating the mean $SSIM_A$ has a negligible effect on performance (just 0.03% in CC). This makes it possible to have a very low complexity metric with a very good performance. Following other simple steps in the method of the embodiment of the invention can raise performance to reach the correlation coefficient of 0.9548 for the WSSIM method.

Figure 10:
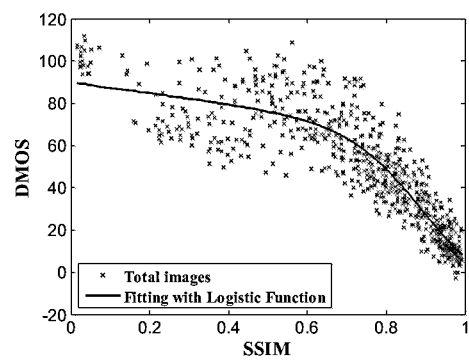
FIG. 10 presents a scatter plot of Difference Mean Opinion Score (DMOS) versus Mean $SSIM_{W\&B}$ model prediction for 779 example distorted images.
Figure 11:
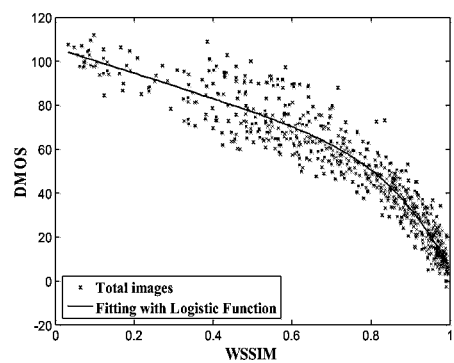
FIG. 11 shows a scatter plot of Difference Mean Opinion Score (DMOS) versus WSSIM score of the preferred embodiment of the invention for the same 779 distorted images used in FIG. 10.

FIG. 10 and FIG. 11 show scatter plots of DMOS versus mean SSIM and WSSIM predictions respectively for all the 779 distorted images. FIG. 10 and FIG. 11 show that WSSIM prediction is more consistent with the subjective scores than the mean SSIM.

Finally, the WSSIM method was tested with the previously defined parameters for various wavelet filters. We observed that the choice of the wavelet filter has a very little effect on performance. The worst case is for the Daubechies 9/7 wavelet, which results in CC=0.9489, RMSE=8.6232, and ROCC=0.9529. These values are still quite acceptable, and so the WSSIM method outperforms the prior art DWT-SSIM.

Thus, in the embodiments of the present invention, we have proposed a SSIM method and system, including the Wavelet Structural Similarity (WSSIM) method and system, which improve the accuracy of spatial domain SSIM prediction, while keeping computational complexity as low as possible. A contrast map, which takes advantage of basic HVS characteristics, for discrete wavelet domain pooling of SSIM maps has been introduced to compute the WSSIM score. Although the WSSIM method is less complex than the method for computing the VIF, its prediction scores are very close to VIF values. Results of simulation experiments show that the first-level approximation subband of decomposed images has an important role to play in improving quality assessment performance and also in reduction of computational complexity. Since the ways of making these improvements that we have discussed here provide very good tradeoffs between accuracy and complexity, they can be used efficiently in wavelet-based image/video processing applications.

Although specific embodiments of the invention have been described in detail, it should be understood that the described embodiments are intended to be illustrative and not restrictive. Various changes and modifications of the embodiments shown in the drawings and described in the specification can be made within the scope of the following claims without departing from the scope of the invention in its broader aspect. For example, various steps of the method that include steps 506 and 508 of FIG. 5 may be performed in parallel by using a multi-core CPU or a multiprocessor system. Similarly, the decomposition of the images X and Y in step 404 of FIG. 4 can be performed in parallel. Such parallel computations can reduce the computation time for calculating the WSSIM score. A 4×4 Gaussian sliding window was used in the WSSIM method described earlier. The method can be readily adapted to accommodate other window sizes. Further simplification of the WSSIM method is also possible if the luminance comparison part of SSIM in equation (1) is ignored, and an approximation SSIM map similar to equation (4) is calculated. Based on our experiments, such simplification reduces the accuracy of the WSSIM by only 0.03%, which is lower than the 1% effect of spatial SSIM simplification presented by D. M. Rouse, and S. S. Hemami, in "Understanding and Simplifying the Structural Similarity Metric," IEEE International Conference on Image Processing, San Diego, pp. 1188-1191, October 2008. A simple sum is computed in equations 2 and 3 for generating the edge maps. However, it is possible to compute the edge maps for the images X and Y using a weighted squared sum, wherein the weights reflect different sensitivity of the human visual system to the different detail subbands.

Although the embodiments of the invention have been described in detail, it will be apparent to one skilled in the art that variations and modifications to the embodiment may be made within the scope of the following claims.

What is claimed is:

1. A system for determining a measure of similarity between an image X and an image Y, the system comprising:
   a processor; and
   a non-transitory computer readable storage medium having computer readable instructions stored thereon, causing the processor to:
   (a) apply a multiresolution decomposition to the image X, producing an approximation subband containing main content of the image X and detail subbands containing fine edges of the image X;
   (b) apply said multiresolution decomposition to the image Y, producing an approximation subband containing main content of the image Y and detail subbands containing fine edges of the image Y;
   (c) determine an approximation similarity measure, characterizing similarity between the main content of the image X and the main content of the image Y, comprising processing the approximation subband of the image X and the approximation subband of the image Y;
   (d) aggregate the detail subbands of the image X, producing an aggregate for the image X;
   (e) aggregate the detail subbands of the image Y, producing an aggregate for the image Y;
   (f) determine an edge similarity measure, characterizing similarity between the fine edges of the image X and the fine edges of the image Y, comprising processing the aggregate for the image X and the aggregate for the image Y; and
   (g) determine the measure of similarity between the image X and the image Y, comprising processing the approximation similarity measure and the edge similarity measure.

2. The system of claim 1, wherein the measure of similarity comprises a Structural Similarity (SSIM) score between the image X and the image Y.

3. The system of claim 1, wherein the computer readable instructions further cause the processor to apply a discrete wavelet transform (DWT) or a discrete cosine transform (DCT).

4. The system of claim 3, wherein the computer readable instructions further cause the processor to determine a Wavelet Structural Similarity (WSSIM) score between the image X and the image Y provided the DWT has been applied, or a Cosine Structural Similarity (CSSIM) score provided the DCT has been applied.

5. The system of claim 2, wherein the computer readable instructions further cause the processor to determine a structural similarity map $SSIM_A$ characterizing a difference between pixels in the approximation subband of the image X and corresponding pixels in the approximation subband of the image Y.

6. The system of claim 1, wherein the computer readable instructions further cause the processor to determine the approximation similarity measure, comprising a structural similarity index using Visual Information Fidelity (VIF) information, the structural similarity index characterizing a difference between pixels in the approximate subband of the image X and corresponding pixels in the approximation subband of the image Y.

7. The system of claim 5, wherein the computer readable instructions further cause the processor to determine the edge similarity measure, comprising an edge structural similarity map $SSIM_E$ characterizing a difference between pixels in the aggregate for the image X and corresponding pixels in the aggregate for the image Y.

8. The system of claim 4, wherein the computer readable instructions further cause the processor to determine the edge similarity measure, comprising an edge structural similarity index using Visual Information Fidelity (VIF) information, the edge structural similarity index characterizing a difference between pixels in the aggregate for the image X and corresponding pixels in the aggregate for the image Y.

9. The system of claim 7, wherein the computer readable instructions further cause the processor to process the $SSIM_A$ and the $SSIM_E$ to obtain the SSIM score.

10. The system of claim 1, wherein the detail subbands of the image X include one or more of a horizontal subband containing horizontal fine edges, a vertical subband containing vertical fine edges and a diagonal subband containing diagonal fine edges of the image X, and wherein the detail subbands of the image Y include one or more of a horizontal subband containing horizontal fine edges, a vertical subband containing vertical fine edges, and a diagonal subband containing diagonal fine edges of the image Y.

11. The system of claim 9, wherein the detail subbands of the image X include one or more of a horizontal subband containing horizontal fine edges, a vertical subband containing vertical fine edges and a diagonal subband containing diagonal fine edges of the image X, and wherein the detail subbands of the image Y include one or more of a horizontal subband containing horizontal fine edges, a vertical subband containing vertical fine edges, and a diagonal subband containing diagonal fine edges of the image Y.

12. The system of claim 1, wherein the computer readable instructions further cause the processor to:
   generate an edge map for the image X, including calculating weighted norm of the detail subbands of the image X; and
   generate an edge map for the image Y, including calculating weighted norm of the detail subbands of the image Y.

13. The system of claim 1, wherein the computer readable instructions further cause the processor to:
   generate a contrast map, including assigning corresponding values to the pixels of the image X and the image Y according to their respective importance to human visual system;
   perform weighted pooling of the approximation similarity measure by using the contrast map to produce an approximation similarity index;
   perform weighted pooling of the edge similarity measure by using the contrast map to produce an edge similarity index; and
   combine the approximation similarity index with the edge similarity index to determine the measure of similarity.

14. The system of claim 7, wherein the computer readable instructions further cause the processor to:
   generate a contrast map, including assigning corresponding values to the pixels of the image X and the image Y according to their respective importance to human visual system;
   perform weighted pooling of the $SSIM_A$ by using the contrast map to produce an approximation similarity index;
   perform weighted pooling of the $SSIM_E$ by using the contrast map to produce an edge similarity index; and
   combine the approximation similarity index with the edge similarity index to determine the SSIM score.

15. The system of claim 1, wherein the computer readable instructions further cause the processor to:
   apply a low-pass filter and a high-pass filter on the image X; and
   apply a low-pass filter and a high-pass filter on the image Y.

16. The system of claim 13, wherein the computer readable instructions further cause the processor to perform one or more of the following:
   to apply a low-pass filter horizontally and a high-pass filter vertically on the image X;
   to apply a high-pass filter vertically and a high-pass filter horizontally on the image X;

to apply a low-pass filter vertically and a high-pass filter horizontally on the image X; and to apply a low-pass filter horizontally and a low-pass filter vertically on the image X.

17. The system of claim 15, wherein the computer readable instructions further cause the processor to:

apply a low-pass filter horizontally and a high-pass filter vertically on the image Y;

apply a high-pass filter vertically and a high-pass filter horizontally on the image Y;

apply a low-pass filter vertically and a high-pass filter horizontally on the image Y; and apply a low-pass filter horizontally and a low-pass filter vertically on the image Y.

18. The system of claim 2, wherein the discrete wavelet transform is one of a Haar transform, a Newland transform, or a wavelet transform using a Daubechies filter.

19. A method for determining a measure of similarity between an image X and an image Y, the method comprising:

(a) applying a multiresolution decomposition to the image X, producing an approximation subband containing main content of the image X and detail subbands containing fine edges of the image X;

(b) applying the multiresolution decomposition to the image Y, producing an approximation subband containing main content of the image Y and detail subbands containing fine edges of the image Y;

(c) determining an approximation similarity measure, characterizing similarity between the main content of the image X and the main content of the image Y, comprising processing the approximation subband of the image X and the approximation subband of the image Y;

(d) aggregating the detail subbands of the image X, producing an aggregate for the image X;

(e) aggregating the detail subbands of the image Y, producing a two dimensional discrete wavelet decomposition aggregate for the image Y;

(f) determining an edge similarity measure, characterizing similarity between the fine edges of the image X and the fine edges of the image Y, comprising processing the aggregate for the image X and the aggregate for the image Y; and (g) determining the measure of similarity between the image X and the image Y, comprising processing the approximation similarity measure and the edge similarity measure.

20. The method of claim 19, wherein the step (a) comprises applying a two Dimensional discrete wavelet decomposition, and the step (g) comprises determining a Wavelet Structural Similarity (WSSIM) score as the measure of similarity.

* * * * *

UNITED STATES PATENT AND TRADEMARK OFFICE
CERTIFICATE OF CORRECTION

PATENT NO. : 8,532,396 B2
APPLICATION NO. : 13/692950
DATED : September 10, 2013
INVENTOR(S) : Soroosh Rezazadeh et al.

It is certified that error appears in the above-identified patent and that said Letters Patent is hereby corrected as shown below:

In the Claims

Column 23, line 15, "claim 2" should read --claim 3--.

Signed and Sealed this
Ninth Day of December, 2014

Michelle K. Lee
*Deputy Director of the United States Patent and Trademark Office*